Jan. 4, 1966 E. E. WILLIAMS 3,227,365

MANUAL COMPUTER

Filed May 6, 1964 2 Sheets-Sheet 1

INVENTOR:
ERNEST E. WILLIAMS
BY
Harrington A. Lackey
ATTORNEY

Jan. 4, 1966 E. E. WILLIAMS 3,227,365
MANUAL COMPUTER
Filed May 6, 1964 2 Sheets-Sheet 2
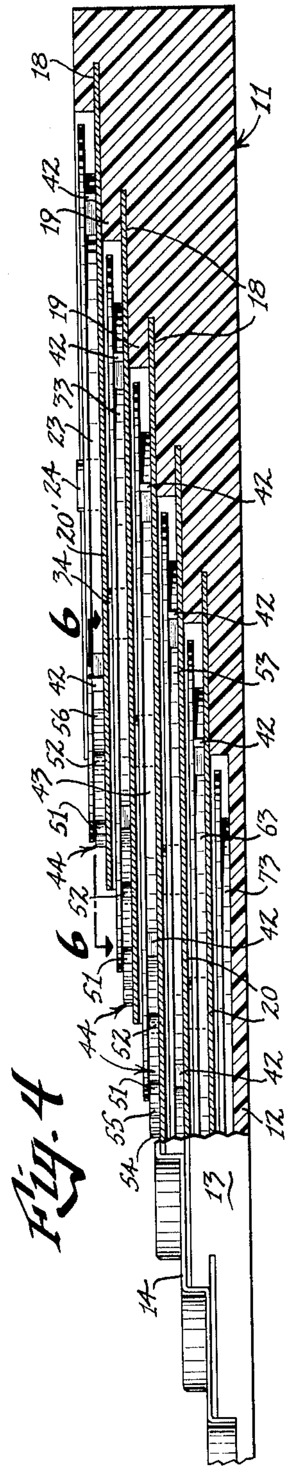
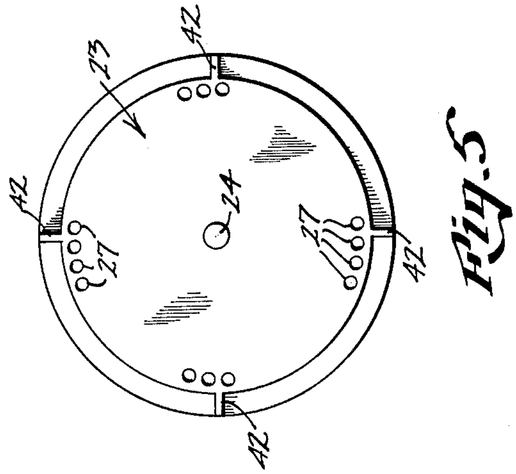
Fig. 5
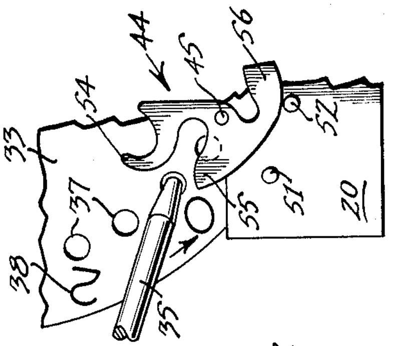
Fig. 7
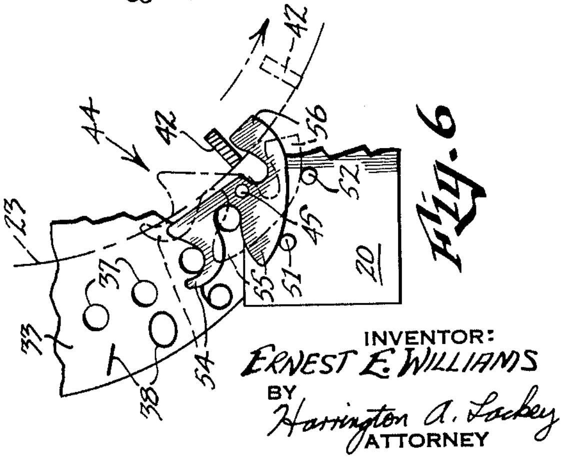
Fig. 6
INVENTOR:
ERNEST E. WILLIAMS
BY
Harrington A. Lackey
ATTORNEY United States Patent Office 3,227,365
Patented Jan. 4, 1966

3,227,365
MANUAL COMPUTER
Ernest E. Williams, Pleasant View, Tenn.
Filed May 6, 1964, Ser. No. 365,302
8 Claims. (Cl. 235—74)

This invention relates to a manual computer, and more particularly to a computer which is semi-automatic in its operation of carrying forward numbers in addition.

Although there are many types of manual computing devices, for adding and subtracting, many of these devices are of a complicated mechanical nature. Moreover, manual computers having apertured means operated by a stylus are also known, but such devices require the operator to remember the numbers to be carried forward in addition from one column to the next.

It is therefore an object of this invention to provide a manual computer adapted to be operated by a stylus and permitting the stylus automatically to carry forward the numbers in addition.

Another object of this invention is to provide a manual computer employing an apertured operative member for each column of figures, and cam means operative to permit the operative member to automatically carry forward the numbers in successive columns, the cam means also indicating to the operator when an additional number must be carried forward.

A further object of this invention is to provide a manual computer incorporating an apertured disk for each column of figures to be operated by a stylus, and a gate means actuated by each preceding disc to permit numbers to be carried forward in successive columns by the stylus, when adding.

Further objects and advantages of the invention will be apparent from the following description taken in conjunction with the drawings, wherein:

FIG. 4 is an enlarged section taken along the line 4—4 of FIG. 3;

FIG. 5 is a bottom plan view of a disc;

FIG. 6 is an enlarged fragmentary section taken along the line 6—6 of FIG. 4, showing the tripping operation of a gate member from a normal operative position to a tripped position; and FIG. 7 is a view similar to FIG. 6, disclosing the stylus just prior to returning the gate member from its tripped position to its normal position.

Figure 1:
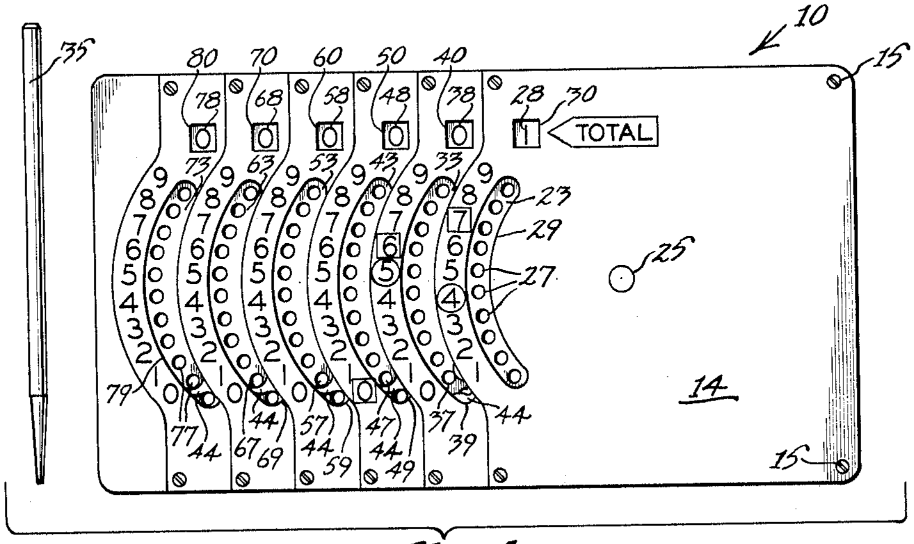
FIG. 1 is a top plan view of a computer made in accordance with this invention and a typical stylus for operating the computer.
Figure 2:
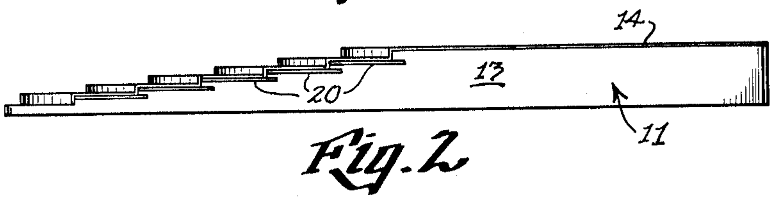
FIG. 2 is a side elevation of the invention.

Referring now to the drawings in more detail, the device or computer 10 comprises a housing 11 having a bottom wall 12, sidewalls 13, and a cover member 14 adapted to be secured to the top edges of the sidewalls 13, by any convenient means, such as bolts 15. As best disclosed in FIG. 4, the right end of the housing 11 is provided with a plurality of vertically spaced and longitudinally staggered slots 18 forming a plurality of stepped platforms 19. Slip-fitted in each slot 18 is a spacer plate 20 of substantially uniform size and shape, but also vertically spaced and longitudinally staggered in the same relationship as the slots 18. Rotatably supported between the cover 14 and the top spacer plate 20′ is a top disk 23 adapted to be freely rotated about the spindle or stub shaft 24. The ends of the stub shaft 24 are journaled in slight depressions, such as 25 in the cover 14 and a similar depression in the top surface of the spacer plate 20′.

Figure 3:
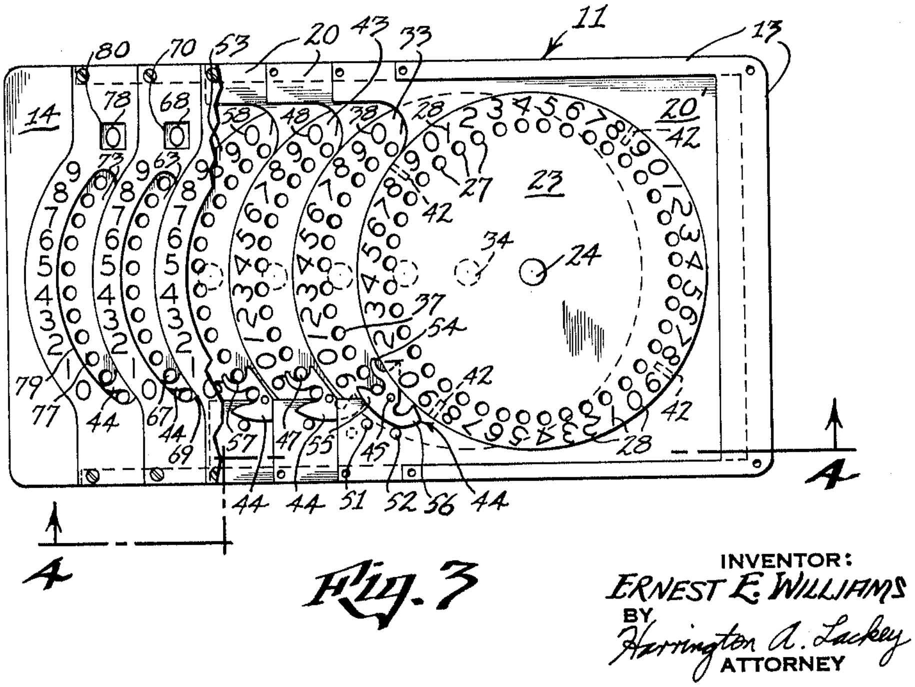
FIG. 3 is a view similar to FIG. 1 with parts of the housing broken away to illustrate the operation of the invention.

The top or first disk 23 is provided with a plurality of uniformly circumferentially spaced apertures 27 of uniform size, spaced inwardly from the periphery of the disk 23. Forty apertures 27 are shown in this particular embodiment of the invention, and they are numbered in four repetitive series clockwise from 0 to 9 as best illustrated in FIG. 3. As best disclosed in FIG. 1 only ten of the apertures 27 are visible at one time to the operator through the first arcuate slot 29 in the cover member 14. The top nine apertures 27 are shown in FIG. 1 as registering with corresponding numerals 1–9 indicated on the cover member 14 adjacent the slot 29. A totalizing window 30 is also formed in cover member 14 to register one of the forty numerals 28 on the disk 23, depending upon the rotary position of the disk 23.

In a similar manner a second disk 33 having shaft 34, apertures 37 and numerals 38 is mounted between the spacer plate 20′ and the next lower spacer plate 20 for free rotatable movement. However, because of the staggered slots 18, the disk 33 is staggered an equal amount longitudinally of the device 10 so that the apertures 37 may be shown through the second arcuate slot 39 and the numerals 38 may be seen through the window 40. In this case, eleven apertures 37, instead of ten, are visible through slot 39. The disks 23 and 33 are separated by the spacer plate 20′ and spaced vertically from each other so that they will rotate in substantially parallel planes.

In a like manner, disk 43, having apertures 47 and numerals 48 is mounted for free rotation between the next staggered pair of spacer plates 20 so that 11 of the apertures 47 may be seen through the arcuate slot 49 and one of the numerals 48 may be seen through the totalizing window 50.

In a similar manner any desired number of additional disks 53, 63 and 73 may be incorporated in the device 10, having corresponding apertures 57, 67, and 77 visible through corresponding slots, 59, 69 and 79, and numerals 58, 68 and 78 visible through windows 60, 70 and 80, respectively.

The top disk 23 is provided with four depending detents or cams 42, which extend below the disk 23 but not so far as to engage or bind against the top surface of the spacer plate 20′. A gate member 44 is journaled on the spacer plate 20′ by means of the pivot pin 45 to swing through a limited arc determined by the stop pins 51 and 52 and in a plane between and parallel to the plane of disks 23 and 33. Formed in one end of the gate member is a first curved gate arm 54 adapted, when the gate member 44 is disposed in normal operative position, to be in circumferential alignment with the apertures 37 as disclosed in FIG. 6. Spaced inwardly toward the pivot pin 45 and slightly offset from the first gate arm 54 is a second arcuate gate arm 55, which is adapted to be in circumferential alignment with the apertures 37 when the gate member 44 has been pivoted to its tripped position (FIG. 7). The other end of gate member 44 comprises a trip lever 56 normally extending beneath the disk 23 and in the rotary path of detent 42. Thus, upon counterclockwise rotation of disk 23, a detent 42 will engage and cam the lever 56 out of the path of the detent to pivot the gate member 44 about its pin 45 as disclosed in FIG. 6. This camming action thrusts the first gate arm 54 out of the circumferential path of the apertures 37 and simultaneously rotates the second gate arm 55 into the circumferential path of the apertures 37.

In order to move the disks 23–73, a stylus 35 (FIG. 1) is inserted into any one of the corresponding apertures, for example, aperture 37 in disk 33 (FIG. 7), and moved in a counter-clockwise direction until the stylus 35 abuts against the bottom edge of the slot 39 or the gate member 44. The gate member 44 is so located that when it is in its tripped position, the stylus 35, inserted into an aperture 37 and moving in a counter-clockwise direction, will enter the slot between the first and second arms 54 and 55 and engage the second gate arm 55 (FIG. 7). Continued movement of the stylus 35 causes the gate member 44 to counter-rotate to its original normal position, as disclosed in solid lines in FIG. 6.

In a similar manner, detents 42 are formed on all the remaining disks 33–63, but not on the lowermost disk 73. Moreover, all of the slots 33–73 are adequate to expose a series of 11 apertures 37–77, and gate members 44 are mounted on the respective spacer plates 20 between each pair of disks.

The operation of the invention will now be described: Assuming that a 0 numeral 28–78 appears in each of the corresponding windows 30–80, and all of the gate members 44 are disposed in their normal operative positions with the trip levers 56 extending into the paths of the detents 42 and the first gate arms 54 circumferentially aligned with their corresponding apertures, the device 10 is then ready for computation. Assuming that the operator desires to add the numbers 54 and 67, he inserts his stylus 35 into the aperture 27 opposite the numeral 4, which has been circled in FIG. 1, adjacent slot 29. He then moves the stylus 35 downwardly in the slot 29 to rotate the disk 23 in a counter-clockwise direction until that particular aperture 27 is in the lowest position in slot 29. When this first operation is completed, the disk 23 will have been rotated an amount equal to the spacing of four apertures 27, so that the numeral 4 will appear in the window 30.

The operator then places the stylus 35 into an aperture 37 opposite the numeral 5, which has been circled in FIG. 1, and moves the stylus downwardly until the stylus engages the first gate arm 54 when the gate member 44 is in its normal position, not shown in FIG. 1, but shown in FIG. 6. In this position, the stylus 35 can move no farther downward because the gate member 44 is abutting the stop pin 51. When this operation is completed, a numeral 5 from the series of integers 38 will appear in the window 40. Thus, the first number 54 to be added appears in the totalizing windows 40 and 30.

In order to add the number 67, the operator inserts the stylus 35 into the aperture 27 opposite the numeral 7 enclosed in the square, FIG. 1, and moves the stylus 35 downwardly until this aperture 27 is in the lowermost position in the slot 29. When this operation is completed, the numeral 1 in the series of integers 28 appears in the window 30, as disclosed in FIG. 1. Also during the operation, a detent 42 has engaged the trip lever 56 to pivot or open the gate member 44 to its tripped position disclosed in FIGS. 1 and 3 and in phantom in FIG. 6, so that the first gate arm 54 is thrown out of circumferential alignment and second gate arm 55 is thrown into circumferential alignment with the apertures 37.

The operator then inserts the stylus 35 into the aperture 37 adjacent the numeral 6, enclosed in another square in FIG. 1, and moves the stylus 35 downwardly until the stylus engages the second gate arm 55, as disclosed in FIG. 7, which causes the gate member 44 to counter-rotate to its original position disclosed in FIG. 6. Because the gate member 44 was open or in its tripped position, the stylus 35 was permitted to move an extra space, or additional distance equal to the spacing between a pair of apertures, so that instead of carrying the aperture 37 only to the first gate arm 54, the stylus carried the aperture to the bottom of the arcuate slot 39. Thus, because of the extra space that the stylus 35 travelled because of the open gate member 44, the integer 38 registering in the window 40 is not a numeral 1 but a numeral 2.

Moreover, as the stylus 35 makes its second descent in the slot 39, the detent 42 on the disc 33 trips the gate member 44 appearing in the bottom of the slot 49, pivoting the second gate arm 55 up into circumferential alignment with the apertures 47. After all of the integers in the numbers 54 and 67 have been moved in their respective columns, or slots, 29 and 39 by the stylus 35, the open gate member 44 in slot 49 indicates to, or reminds, the operator that he must insert his stylus 35 into the apertures 47 opposite the 0, also shown in a square in FIG. 1, and move this aperture down one space until the stylus 35 engages the second gate arm 55 and counter-rotate gate member 44 to its normal closed position. This operation also causes the numeral 48 to appear as the numeral 1 in the window 50. Thus, the total sum of numbers 54 and 67 appears in the windows 50, 40 and 30 as 121.

When it is desired to clear the computer 10 so that only 0's register in the windows 30–80, the stylus 35 is inserted into the lowermost aperture 27 in the slot 29 and moved upwardly or clockwise until the detent 24, disclosed in phantom in FIG. 6, engages the trip lever 56. Since the gate arm 55 is abutting the stop pin 51, the detent 42 and disc 23 can rotate no farther in a clockwise direction, and in this position, the numeral 28 appears as 0 in the window 30. This operation is repeated for each successive slot 39–79 until the computer 10 is cleared.

This same operation may be carried out for the addition of any series of numbers and numbers having as many digits or integers as there are windows and discs in the device 10. Although windows 30–80 and discs 23–73 have been provided for a six-digit total, the discs, windows and slots may be increased or decreased depending upon the number of digits desired.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. A manual computer comprising:

(a) a base, (b) a first disk, having a plurality of first apertures uniformly spaced around the periphery thereof, (c) a second disk having a plurality of second apertures uniformly spaced around the periphery thereof, (d) means for journaling said first disk in said base for free rotational movement about its center, (e) means for journaling said second disk in said base for rotational movement about its center off-set from the center of said first disk and in a plane spaced from said first disk, (f) detents uniformly spaced about the periphery of said first disk and extending toward said second disk, (g) a gate member having spaced first and second gate arms on one end thereof and a trip lever on the other end, (h) means for journaling said gate member on said base for limited pivotal movement in a plane between said disks from a normal position to a tripped position, (i) said first gate arm being in circumferential alignment with said second apertures, and said trip lever being in circumferential alignment with said detents, when said gate member is in normal position, (j) said first gate arm being pivoted out of circumferential alignment with second apertures, and said second gate arm being pivoted into circumferential alignment with said second apertures, when said gate member is pivoted to tripped position by the engagement of a detent with said trip lever.

2. The invention according to claim 1 further comprising a stylus for insertion into any one of said apertures for rotatably moving its corresponding disk, said stylus when inserted into a second aperture being adapted to engage said second gate arm in tripped position to rotate and return said gate member to normal position.

3. The invention according to claim 1 further comprising a stop on said base in the rotational path of said gate member to limit the counter-rotational movement of said gate member when said first gate arm is in circumferential alignment with said second apertures.

4. The invention according to claim 1 further comprising a cover member mounted on said base, said cover member comprising a first arcuate slot circumferentially aligned with said first apertures to expose ten of said apertures in series, a second arcuate slot spaced from said first slot and in circumferential alignment with said second apertures to expose eleven of said second apertures in series, indicia on said disks to indicate the number of spaces between apertures said disks have moved.

5. The invention according to claim 4 in which said first gate arm in normal position is spaced from one end of said second slot a distance equal to the spacing of said second apertures.

6. A manual computer comprising:

(a) a base, (b) a first movable member having a linear series of first uniformly spaced apertures therein, (c) a second movable member having a linear series of second uniformly spaced apertures therein, (d) means on said base for supporting said members spaced adjacent each other for independent movement in the same forward linear directions of said respective series, (e) operative means for engaging said apertures to move said members in said linear directions, (f) a stop member on said base extending across the linear path of said second apertures to stop the forward linear movement of said operative means, (g) a gate member, (h) means for movably mounting said gate member on said base to move between a normal position and a tripped position, (i) said gate member in said normal position extending across the linear path of said second apertures and being spaced behind said stop member a distance equal to the spacing between said second apertures, to stop the forward linear movement of said operative means, (j) said gate member in said tripped position being moved away from the linear path of said second apertures to permit said operative means to move against said stop member, and (k) means on said first member for actuating said gate member to move to said tripped position when said first member has moved a distance equal to the spacings of a multiple number of said first apertures.

7. The invention according to claim 6 in which said gate member comprises a trip lever, and said actuating means comprises a cam on said first member adapted to engage said trip lever.

8. The invention according to claim 6 in which said gate member comprises an arm extending across the path of said second apertures when said gate member is in its tripped position, so that said operative means will engage said arm to return said gate member to its normal position, when said operative means is moving a second aperture in said forward linear direction.

References Cited by the Examiner

UNITED STATES PATENTS

| | | | |
|---|---|---|---|
| 100,288 | 3/1870 | Groesbeck | 235—74 |
| 1,214,262 | 1/1917 | Bannihr | 235—74 |
| 1,657,923 | 1/1928 | Goshko | 235—74 X |

FOREIGN PATENTS

| | | |
|---|---|---|
| 99,644 | 11/1898 | Germany. |

LEO SMILOW, *Primary Examiner.*